(12) United States Patent
Oh et al.

(10) Patent No.: US 11,747,010 B1
(45) Date of Patent: Sep. 5, 2023

(54) DOWNLIGHT SYSTEM INTEGRATING CAPACITIVE TOUCH SENSOR AND LED MODULE FOR GAMING DISPLAYS

(71) Applicant: Dell Products L.P., Round Rock, TX (US)

(72) Inventors: Guentaek Oh, Singapore (SG); Kyung Eun Lee, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/894,283

(22) Filed: Aug. 24, 2022

(51) Int. Cl.
*F21V 33/00* (2006.01)
*F21V 23/04* (2006.01)
*A63F 13/214* (2014.01)
*F21Y 115/10* (2016.01)

(52) U.S. Cl.
CPC ........ *F21V 33/0052* (2013.01); *A63F 13/214* (2014.09); *F21V 23/0485* (2013.01); *F21Y 2115/10* (2016.08)

(58) Field of Classification Search
CPC . F21V 33/0052; F21V 23/0485; A63F 13/214
See application file for complete search history.

(56) References Cited

U.S. PATENT DOCUMENTS

| | | | | |
|---|---|---|---|---|
| 2,632,098 A * | 3/1953 | Marchese | ............... | F21V 23/04 307/328 |
| 2,810,066 A * | 10/1957 | Green | ..................... | F21S 6/002 335/239 |
| 4,211,959 A * | 7/1980 | Deavenport | ......... | H03K 17/962 200/600 |
| 4,764,708 A * | 8/1988 | Roudeski | ................ | F21V 23/04 327/308 |
| 5,217,295 A * | 6/1993 | Tortola | ..................... | A63F 13/98 362/396 |
| 6,578,972 B1 | 6/2003 | Heirich et al. | | |
| 6,634,763 B1 * | 10/2003 | Leiter | .................... | G02B 25/02 362/85 |
| 7,054,133 B2 * | 5/2006 | Orth | ..................... | H03K 17/962 361/278 |
| 8,827,517 B2 | 9/2014 | Cammenga et al. | | |
| 9,794,994 B2 * | 10/2017 | Newton | .................. | G06F 3/044 |
| 9,886,613 B2 * | 2/2018 | Pi | ........................... | G06F 1/1643 |
| 10,114,411 B2 * | 10/2018 | Hwang | ................. | H04W 12/06 |
| 10,741,621 B2 * | 8/2020 | Choo | ..................... | H10K 59/65 |
| 11,428,740 B2 * | 8/2022 | Chang | .................... | G06F 1/1684 |
| 2022/0228734 A1 * | 7/2022 | Setteducati | .......... | F21V 19/003 |

\* cited by examiner

*Primary Examiner* — Arman B Fallahkhair
(74) *Attorney, Agent, or Firm* — Larson Newman, LLP

(57) ABSTRACT

A monitor includes a metallic edge piece and a downlight module. The edge piece provides a contact surface to receive touch inputs for a touch sensor. The downlight module includes the touch sensor and a lamp. The downlight module is coupled to the edge piece to receive the touch inputs to turn on and off the lamp.

17 Claims, 5 Drawing Sheets

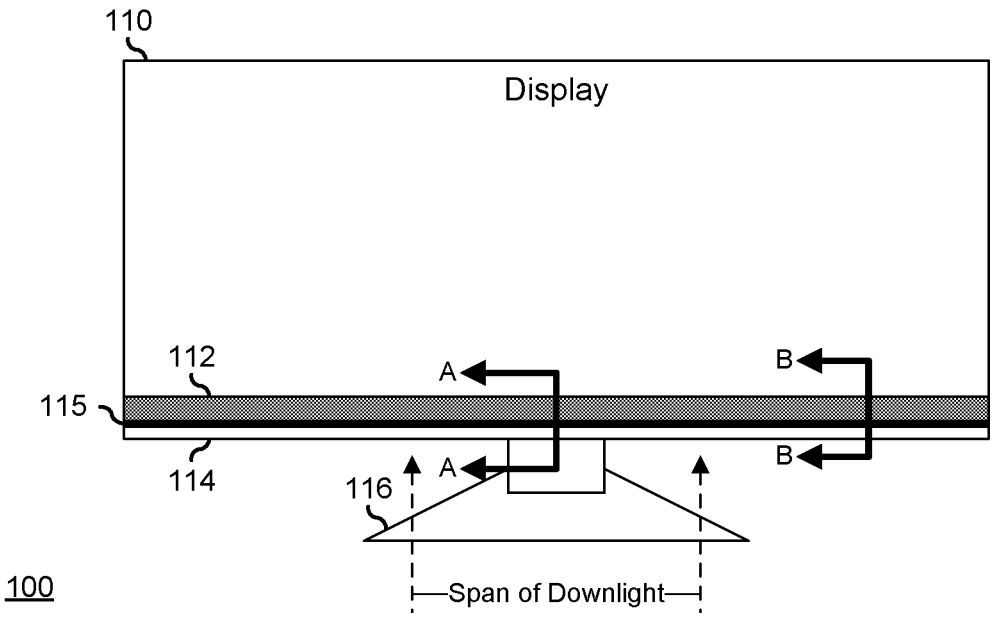
FIG. 1A
*(Prior Art)*
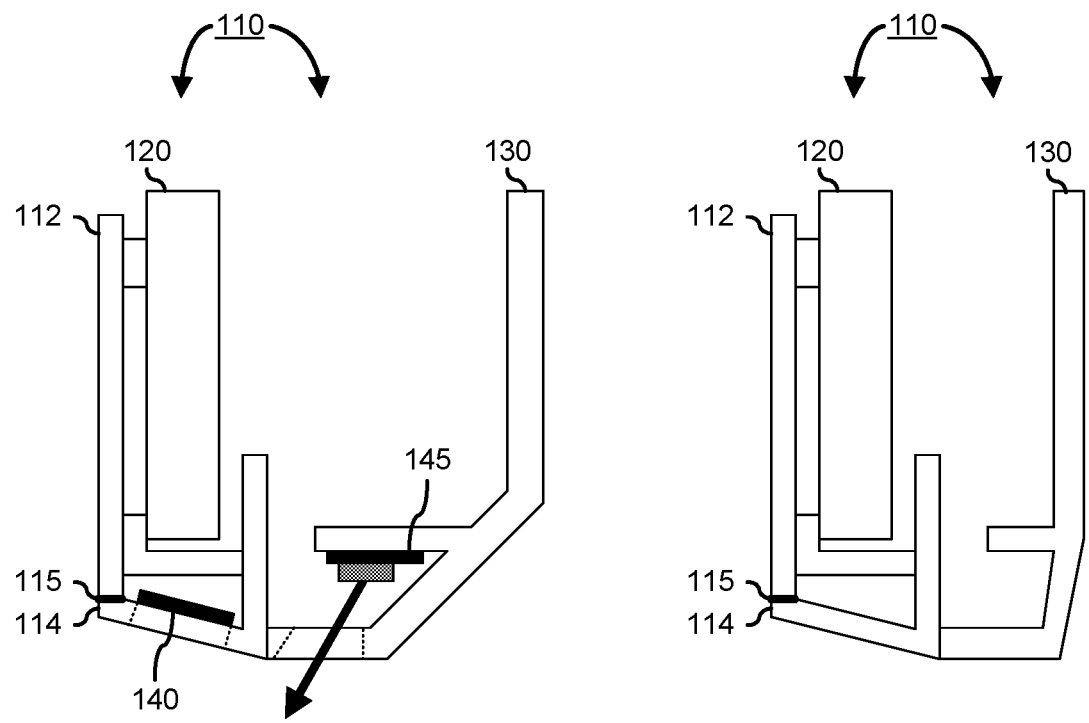
(A – A)
FIG. 1B
(B – B)
FIG. 1C

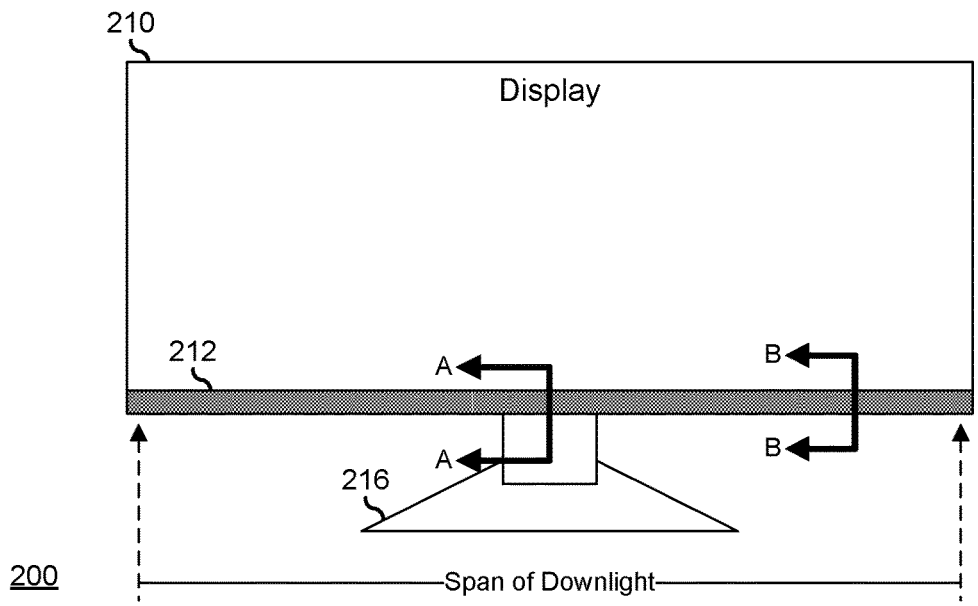
*FIG. 2A*
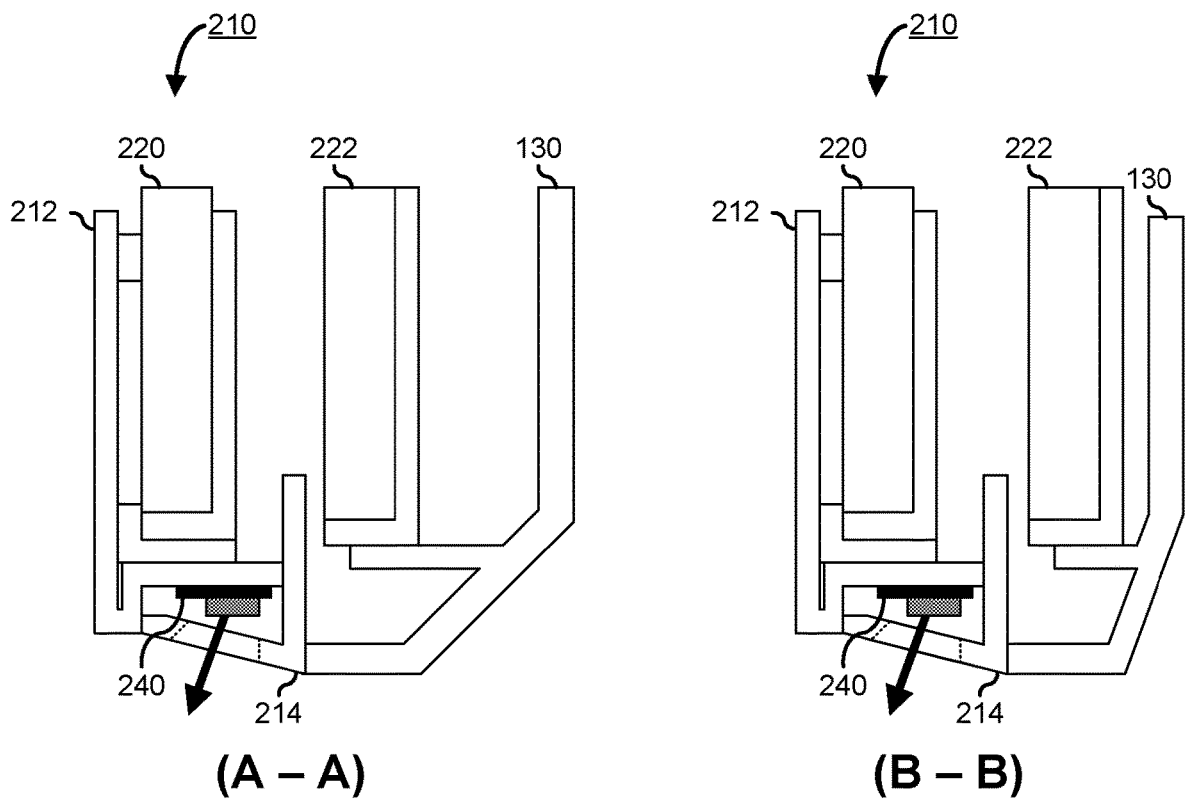
*FIG. 2B*   *FIG. 2C*

(A – A) & (B – B)

(A – A) & (B – B)

ования, enterprise data storage, or global communications.
DOWNLIGHT SYSTEM INTEGRATING CAPACITIVE TOUCH SENSOR AND LED MODULE FOR GAMING DISPLAYS

FIELD OF THE DISCLOSURE

This disclosure generally relates to information handling systems, and more particularly relates to a downlight system integrating a capacitive touch sensor and a light emitting diode module for gaming displays of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A monitor may include a metallic edge piece and a downlight module. The edge piece may provide a contact surface to receive touch inputs for a touch sensor. The downlight module may include the touch sensor and a lamp. The downlight module may be coupled to the edge piece to receive the touch inputs to turn on and off the lamp.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1A is an illustration of a monitor as is known in the art;

FIGS. 1B and 1C are cross-sectional views of the monitor of FIG. 1A taken along lines A-A and B-B;

FIG. 2A is an illustration of a monitor according to an embodiment of the current disclosure;

FIGS. 2B and 2C are cross-sectional views taken along lines A-A and B-B of FIG. 2A;

The use of the same reference symbols in different drawings indicates similar or identical items.

DETAILED DESCRIPTION OF DRAWINGS

Figure 3A:
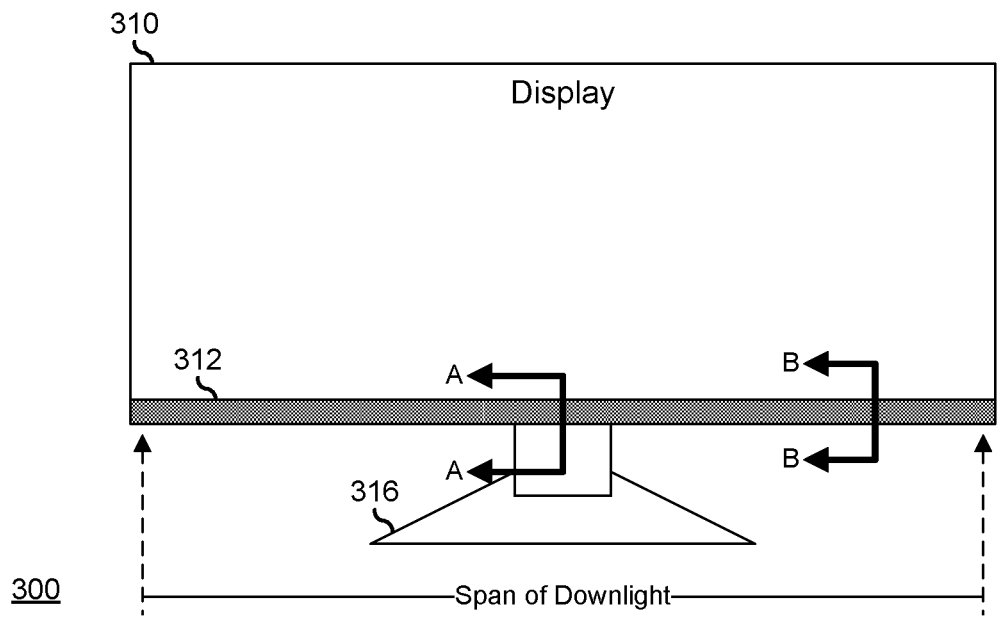
FIG. 3A is an illustration of a monitor according to an embodiment of the current disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIG. 1A illustrates a monitor 100 according to the prior art, including a display panel 110, a decorative edge piece 112, a bottom frame 114, and a display stand 116. Monitor 100 represents a display device configured to receive video content and to display the video content on display panel 110. FIGS. 1A and 1B illustrate sectional views (A-A) and (B-B), where display panel 110 includes a display matrix device 120, such as a liquid crystal display device, an Organic Light Emitting Diode (OLED) device, or the like. Monitor 100 will be understood to have a minimum depth as shown in section A-A, where the space behind display matrix device 120, as shown by a back frame 130, is provided to accommodate the various components of the monitor, such as printed circuit boards (PCBs), power supplies, and the like, to operate the monitor. However, the amount of space needed for the components may not necessarily extend to the entire width of monitor 100. As such, in section B-B, at an outer edge of monitor 100, the depth of the monitor is reduced to shrink the overall envelope of the monitor and reduce the weight of the monitor. As such, the area behind display matrix device 120, as shown by back frame 130, is reduced. The union of edge piece 112 and bottom frame 114 results in a visible gap 115 between the edge piece and the bottom frame. In certain circumstances, light from display panel 110 may leak out of gap 115.

Monitor 100 includes a downlight function to selectively brighten an area underneath and in front of the monitor based upon a user input. Typically, the user input is provided by a touch sensitive input device that turns on and off a LED lamp. Monitor 100 includes a touch sensor PCB 140 and a LED PCB 145 that, together, provide the downlight function. Touch sensor PCB 140 is mounted on bottom frame 114, and a cut-out in the bottom frame, indicated by the dashed lines, is provided in the bottom frame to permit the user to engage with a touch sensor integrated with the touch sensor PCB. The user's input is transmitted to LED PCB 145 to indicate to turn on or off a LED lamp integrated with the LED PCB. LED PCB 145 is mounted on back frame 130, and a cut-out in the back frame permits the light from the LED lamp to shine underneath and in front of monitor 100. The cut-out in back frame 130 may include a lens to focus or broaden the beam of light from the LED lamp, as needed or desired. LED PCB 145, mounted on back frame 130, is limited as to the span of the width of monitor 100 that can accommodate the LED PCB, due to the narrowing of the space provided by the back frame, as shown in section B-B. As such, the area of illumination provided by the backlight function will be understood to be limited to a narrow span of the width of monitor 100, as illustrated.

FIG. 2A illustrates a monitor 200 according to an embodiment of the current disclosure, including a display panel 210, a decorative edge piece 212, and a display stand 216. Monitor 200 is similar to monitor 100, and represents a display device configured to receive video content and to display the video content on display panel 210. FIGS. 2B and 2C illustrate sectional views (A-A) and (B-B), where display panel 210 includes a display matrix device 220 similar to display matrix device 120. Similar to monitor 100, monitor 200 will be understood to have a minimum depth as shown in section A-A, where the space behind display matrix device 220, as shown by a back frame 230, is provided to accommodate the various components of the monitor, such as printed circuit boards (PCBs), power supplies, and the like, to operate the monitor. Again, similar to monitor 100, the amount of space needed for the components may not necessarily extend to the entire width of monitor 200, and as shown in section B-B, at an outer edge of monitor 200, the depth of the monitor is reduced to shrink the overall envelope of the monitor and reduce the weight of the monitor. As such, the area behind display matrix device 220, as shown by back frame 230, is reduced. Sectional views A-A and B-B show that monitor 200 includes a bottom frame 214, but the profile of edge piece 212 is such that no gap is present between the edge piece and the bottom frame, as described further below.

Monitor 200 includes a downlight function to selectively brighten an area underneath and in front of the monitor based upon a user input. Monitor 200 includes a touch sensor/LED PCB 240 that combines the functions of touch sensor PCB 140 and LED PCB 145 as described above. In particular, touch sensor/LED PCB 240 includes a LED lamp that shines through a cut-out in bottom frame 214, in a similar location to the cut-out for touch sensor PCB 140 as described above to shine underneath and in front of monitor 200. The cut-out in bottom frame 214 may include a lens to focus or broaden the beam of light from the LED lamp, as needed or desired.

In this embodiment, edge piece 212 is not merely decorative, but is also functional. Edge piece 212 is electrically connected to touch sensor/LED PCB 240, and provides a touch pad function for the touch sensor/LED PCB. In particular, edge piece 212 is made of metal, or has a metallic surface that conducts to touch sensor/LED PCB 240 to indicate that the surface has been touched by a user to trigger the turning on or off of the LED lamp of the PCB. Further, edge piece 212 is formed in a triple-bend pattern, where, from the front surface, the edge piece forms a "U" shape at the bottom (that is, the first two bends), and forms an elbow bend (that is, the third bend) to redirect to a horizontal direction to form a surface to electrically and mechanically attach to touch sensor/LED PCB 240. The triple-bend pattern of edge piece 212 further forms a hemming region that covers the front face of bottom frame 214, thereby eliminating the unsightly gap between the edge piece and the bottom frame.

Because touch sensor/LED PCB 240 is mounted to bottom frame 212, the narrowing of back frame 230 at the edges of monitor 200 does not restrict the space into which the touch sensor/LED PCB can be mounted, and the touch sensor/LED PCB can extend to the entire width of the monitor, as illustrated. Similarly, because the touch pad function is provided by edge piece 212, the entirety of the edge piece can be utilized as a touch point to turn the LED lamp on and off. Thus, in a particular embodiment, the downlight function provided by monitor 200 extends across the entire width of the monitor. The LED lamp may consist of a single element that extends the width of monitor 200, or may consist of multiple closely spaced LED lamps that extend the width of the monitor.

In a particular embodiment, where the LED lamp consists of multiple closely spaced LED lamps, the touch sensor function ascribed to edge piece 212 is localized along the width of monitor 200, such that a touch in a particular portion of the edge piece functions to turn on and off the LED lamp segments proximate to the touch. For example, the downlight function may be partitioned into three segments: a left segment, a middle segment, and a right segment. A touch to the leftward side of edge piece 212 can operate to turn on and off the LED lamp segments on the left side of monitor 200, a touch to the middle of the edge piece can operate to turn on and off the LED lamp segments in the middle of the monitor, and a touch to the rightward side of the edge piece can operate to turn on and off the LED lamp segments on the right side of the monitor.

Figure 3B:
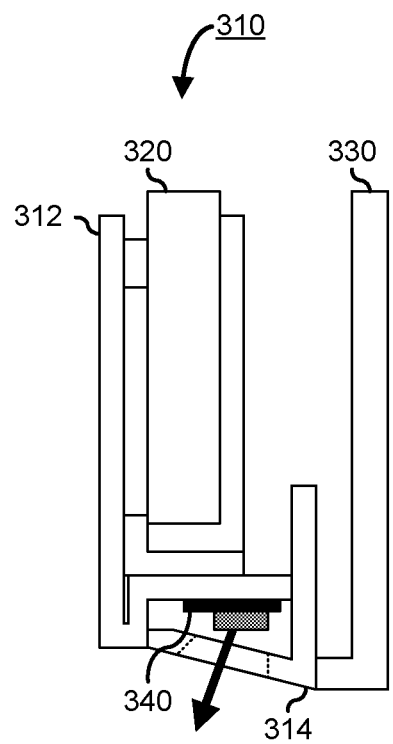
FIG. 3B is a cross-sectional view taken along lines A-A and B-B of FIG. 3A.

FIG. 3A illustrates a monitor 300 according to an embodiment of the current disclosure, including a display panel 310, a decorative edge piece 312, and a display stand 316. Monitor 300 is similar to monitor 200, and represents a display device configured to receive video content and to display the video content on display panel 310. FIG. 3B illustrates sectional views (A-A) and (B-B), where display panel 310 includes a display matrix device 320, such as a LED display device, an Organic LED (OLED) display device, a Quantum Dot (QD) OLED display device, or the like. However, monitor 300 does not include a LED backlight device, and the depth between display matrix device 320 and a back frame 330 can be more uniform, as shown in sections A-A and B-B. Note that sectional views A-A and B-B show that monitor 300 includes a bottom frame 314, but that the profile of edge piece 312 is such that no gap is present between the edge piece and the bottom frame, as described further below.

Monitor 300 includes a downlight function similar to the downlight function implemented by monitor 200. Monitor 300 includes a touch sensor/LED PCB 340 that combines the functions of touch sensor PCB 140 and LED PCB 145 as described above. In particular, touch sensor/LED PCB 340 includes a LED lamp that shines through a cut-out in bottom frame 314, in a similar location to the cut-out for touch sensor PCB 140 as described above to shine underneath and in front of monitor 300. The cut-out in bottom frame 314 may include a lens to focus or broaden the beam of light from the LED lamp, as needed or desired. Edge piece 312 is electrically connected to touch sensor/LED PCB 340, and provides a touch pad function for the touch sensor/LED PCB. The triple-bend pattern of edge piece 312 forms a hemming region that covers the front face of bottom frame 314, thereby eliminating the unsightly gap between the edge piece and the bottom frame.

The uniformity of back frame 330 in the middle of monitor 300 and at the edges of the monitor does not restrict the space into which touch sensor/LED PCB 340 can be mounted, and the touch sensor/LED PCB can extend to the entire width of the monitor, as illustrated. Similarly, because the touch pad function is provided by edge piece 312, the entirety of the edge piece can be utilized as a touch point to turn the LED lamp on and off. Thus, in a particular embodiment, the downlight function provided by monitor 300 extends across the entire width of the monitor. The LED lamp may consist of a single element that extends the width of monitor 300, or may consist of multiple closely spaced LED lamps that extend the width of the monitor. In a particular embodiment, where the LED lamp consists of multiple closely spaced LED lamps, the touch sensor function ascribed to edge piece 312 is localized along the width of monitor 300, such that a touch in a particular portion of the edge piece functions to turn on and off the LED lamp segments proximate to the touch. For example, the downlight function may be partitioned into three segments: a left segment, a middle segment, and a right segment. A touch to the leftward side of edge piece 312 can operate to turn on and off the LED lamp segments on the left side of monitor 300, a touch to the middle of the edge piece can operate to turn on and off the LED lamp segments in the middle of the monitor, and a touch to the rightward side of the edge piece can operate to turn on and off the LED lamp segments on the right side of the monitor.

Figure 4A:
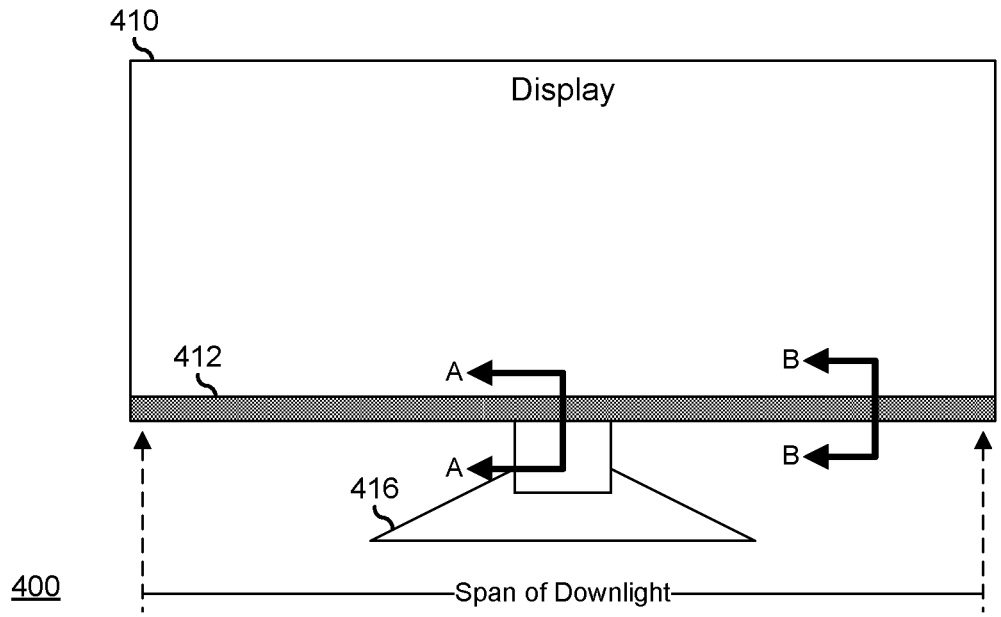
FIG. 4A is an illustration of a monitor according to an embodiment of the current disclosure.
Figure 4B:
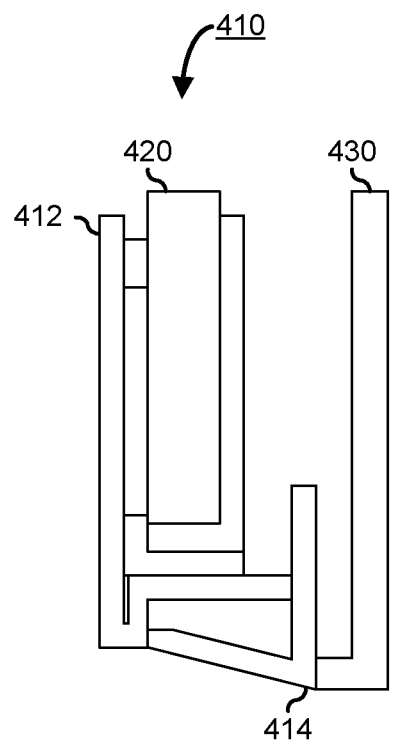
FIG. 4B is a cross-sectional view taken along lines A-A and B-B of FIG. 4A.

FIG. 4A illustrates a monitor 400 according to an embodiment of the current disclosure, including a display panel 410, a decorative edge piece 412, and a display stand 416. Monitor 400 represents a display device configured to receive video content and to display the video content on display panel 410. FIG. 4B illustrates sectional views (A-A) and (B-B), where display panel 410 includes a display matrix device 420, such as a LED display device, an Organic LED (OLED) display device, or the like. However, here, monitor 400 does not include a LED backlight device, and the depth between display matrix device 420 and a back frame 430 can be more uniform, as shown in sections A-A and B-B. Monitor 400 differs from monitors 100, 200, and 300 in that monitor 400 does not include a downlight function similar to the downlight function. However, monitor 400 includes a bottom frame 414, and the profile of edge piece 412 is such that no gap is present between the edge piece and the bottom frame. Edge piece 412 may be secured to bottom frame 414, or to other structural members of monitor 400 by a fastening device such as a screw or rivet, or may include a hook structure that snaps into a slot on the bottom frame or other structural member, as needed or desired.

Figure 5:
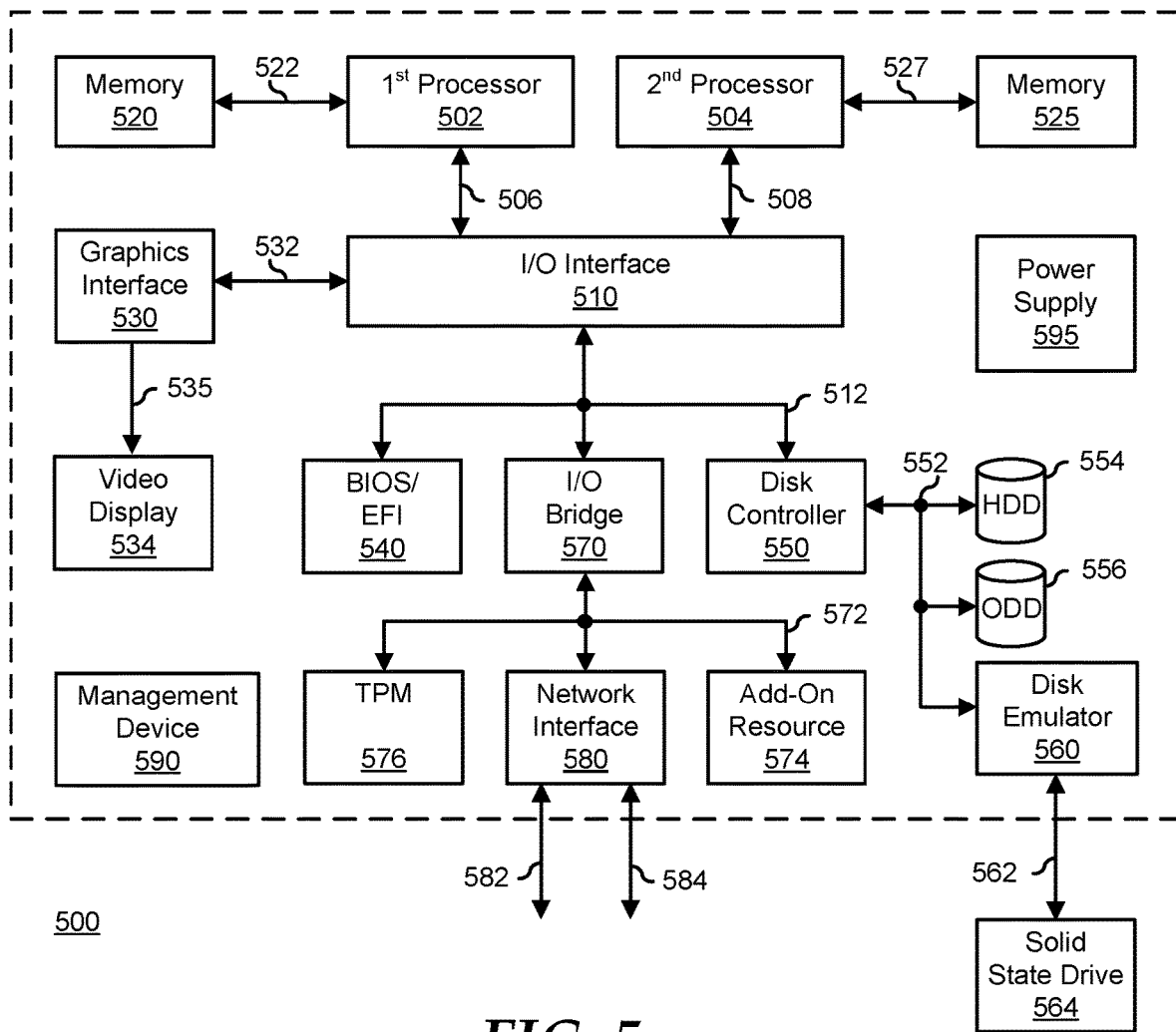
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520 and 525, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 535 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on a separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A monitor, comprising:
   a metallic edge piece configured to provide a contact surface to provide touch inputs for a touch sensor;
   a downlight module including the touch sensor and a lamp, the downlight module coupled to the edge piece to receive the touch inputs to turn on and off the lamp; and
   a bottom frame coupled to the edge piece to provide an accommodation space for a circuit board including the touch sensor and the lamp, the bottom frame including a cut-out to permit light to be emitted from the lamp to illuminate an area in front of the monitor, and wherein the edge piece extends from a front of the monitor substantially along a light-emitting direction of the downlight module such that the edge piece hides the bottom frame from view from a location in front of the monitor.

2. The monitor of claim 1, wherein, when turned on, the lamp illuminates a region below and in front of the monitor.

3. The monitor of claim 2, wherein the downlight module extends to substantially a width of the monitor.

4. The monitor of claim 3, wherein the lamp extends to substantially the width.

5. The monitor of claim 4, wherein the lamp comprises a single light emitting diode.

6. The monitor of claim 4, wherein the lamp comprises a plurality of light emitting diodes.

7. The monitor of claim 3, wherein the region extends to substantially the width.

8. The monitor of claim 1, further comprising a bottom frame.

9. The monitor of claim 1, further comprising a Quantum Dot Organic light emitting diode display device.

10. A method, comprising:
   providing, on a monitor, a metallic edge piece;
   providing, by the edge piece, a contact surface to provide touch inputs for a touch sensor;
   coupling a downlight module to the edge piece, wherein the downlight module includes a lamp;
   receiving, by the downlight module, the touch inputs to turn on and off the lamp;
   coupling the bottom frame to the edge piece to provide an accommodation space for a circuit board including the touch sensor and the lamp, the bottom frame including a cut-out to permit light to be emitted from the lamp to illuminate an area in front of the monitor; and
   extending the edge piece from a front of the monitor substantially along a light-emitting direction of the downlight module such that the edge piece hides the bottom frame from view from a location in front of the monitor.

11. The method of claim 10, further comprising illuminating, by the lamp, a region below and in front of the monitor when the lamp is turned on.

12. The method of claim 11, wherein the downlight module extends to substantially a width of the monitor.

13. The method of claim 12, wherein the lamp extends to substantially the width.

14. The method of claim 13, wherein the lamp comprises a single Light Emitting Diode.

15. The method of claim 13, wherein the lamp comprises a plurality of Light Emitting Diodes.

16. The method of claim 12, wherein the region extends to substantially the width.

17. The method of claim 10, wherein the module further includes a bottom frame.

\* \* \* \* \*